Aug. 22, 1950  R. C. HEFFERNAN ET AL  2,519,963
PILOT SEAT
Filed Jan. 30, 1947  6 Sheets-Sheet 1

INVENTORS
Robert C. Heffernan
Fred N. Dickerman
M. B. Tasker ATTORNEY

Aug. 22, 1950   R. C. HEFFERNAN ET AL   2,519,963
PILOT SEAT
Filed Jan. 30, 1947   6 Sheets-Sheet 6
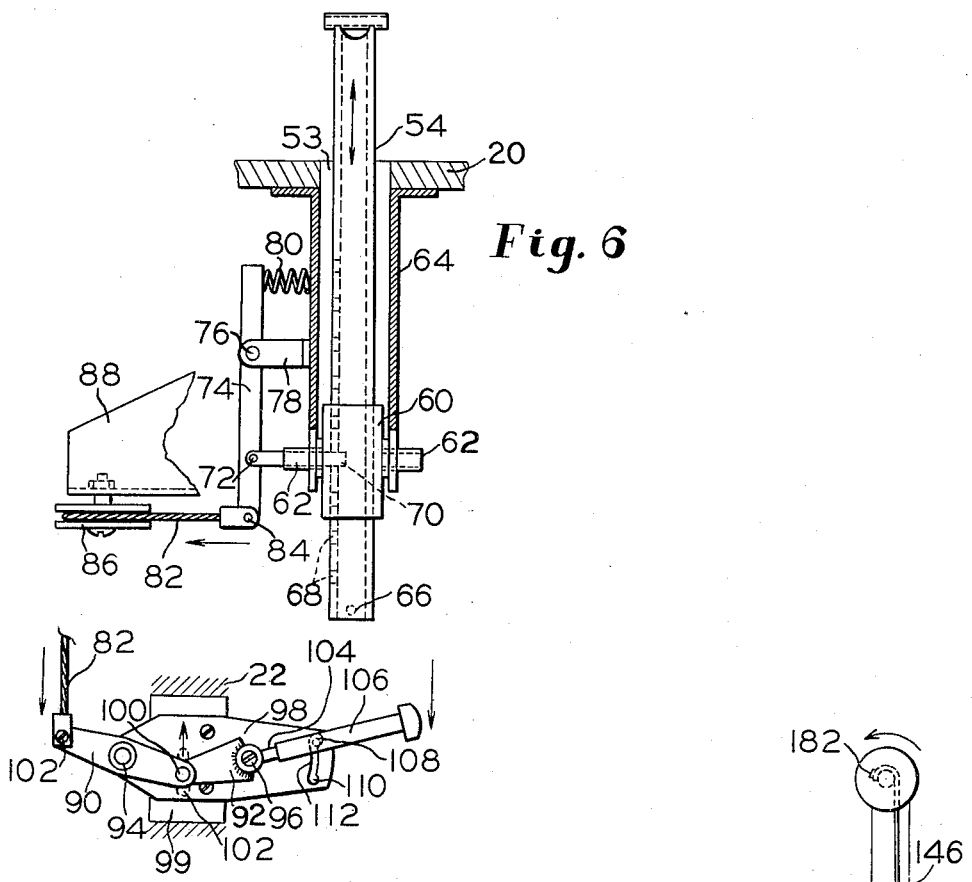
Fig. 6
Fig. 7
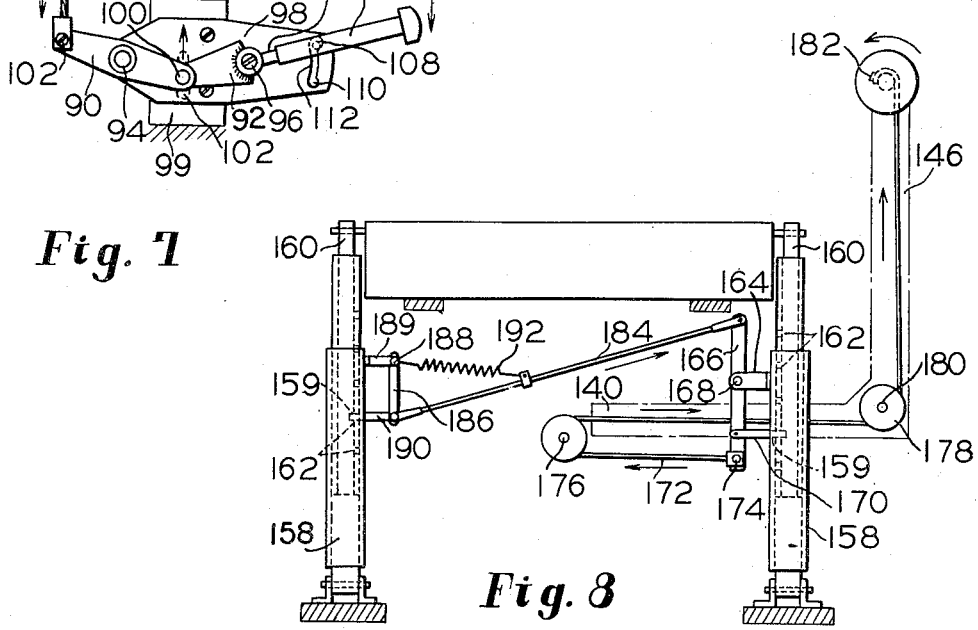
Fig. 8
INVENTORS
Robert C. Heffernan
Fred N. Dickerman
M. B. Tasker ATTORNEY Patented Aug. 22, 1950

2,519,963

UNITED STATES PATENT OFFICE 2,519,963

PILOT SEAT

Robert C. Heffernan, Garden City, N. Y., and Fred N. Dickerman, Nichols, Conn., assignors to United Aircraft Corporation, East Hartford, Conn., a corporation of Delaware Application January 30, 1947, Serial No. 725,238

4 Claims. (Cl. 155—118)

This invention relates to adjustable seats and particularly to a pilot's seat for a fighter airplane.

Physical fatigue during combat is, potentially, as great a danger to the fighter pilot as the fire power of the enemy. It is accordingly highly desirable to provide a seat which is adaptable to the pilot's particular stature and which will enable the pilot to relax in comfort until he arrives at the combat area.

An object of this invention is to provide a pilot's seat which enables the pilot to position himself for maintaining maximum visibility during take-off and landing, and to place himself in the best position for using his gunsight during combat, while also enabling him to adjust his seat to permit him to cruise in comfort.

A further object of the invention is to provide a seat which is adjustable to suit the stature of different pilots.

More specifically, it is an object of the invention to provide improved mechanism for independently adjusting and securing separate back and bottom seat portions, while also providing mechanism for bodily adusting and securing the seat vertically in the various adjusted positions of the back and bottom portions.

A further object of the invention is the provision of conveniently located mechanism by which the pilot can make any of the above adjustments while sitting in the seat and by which the seat portions can be locked in any adjusted position and released at the will of the pilot.

These and other objects of the invention will become apparent from the following detailed description of the accompanying drawings which illustrate one embodiment of the invention.

In these drawings:

Fig. 6 is a somewhat diagrammatic view of the mechanism for locking the back of the seat in various positions of angular adjustment.

Fig. 7 is a detailed view showing the pilot operated mechanism for controlling the locking mechanism of Fig. 6.

Fig. 8 is a somewhat diagrammatic view of the pilot controlled mechanism for releasing and securing the seat raising and lowering mechanism.

Figure 1:
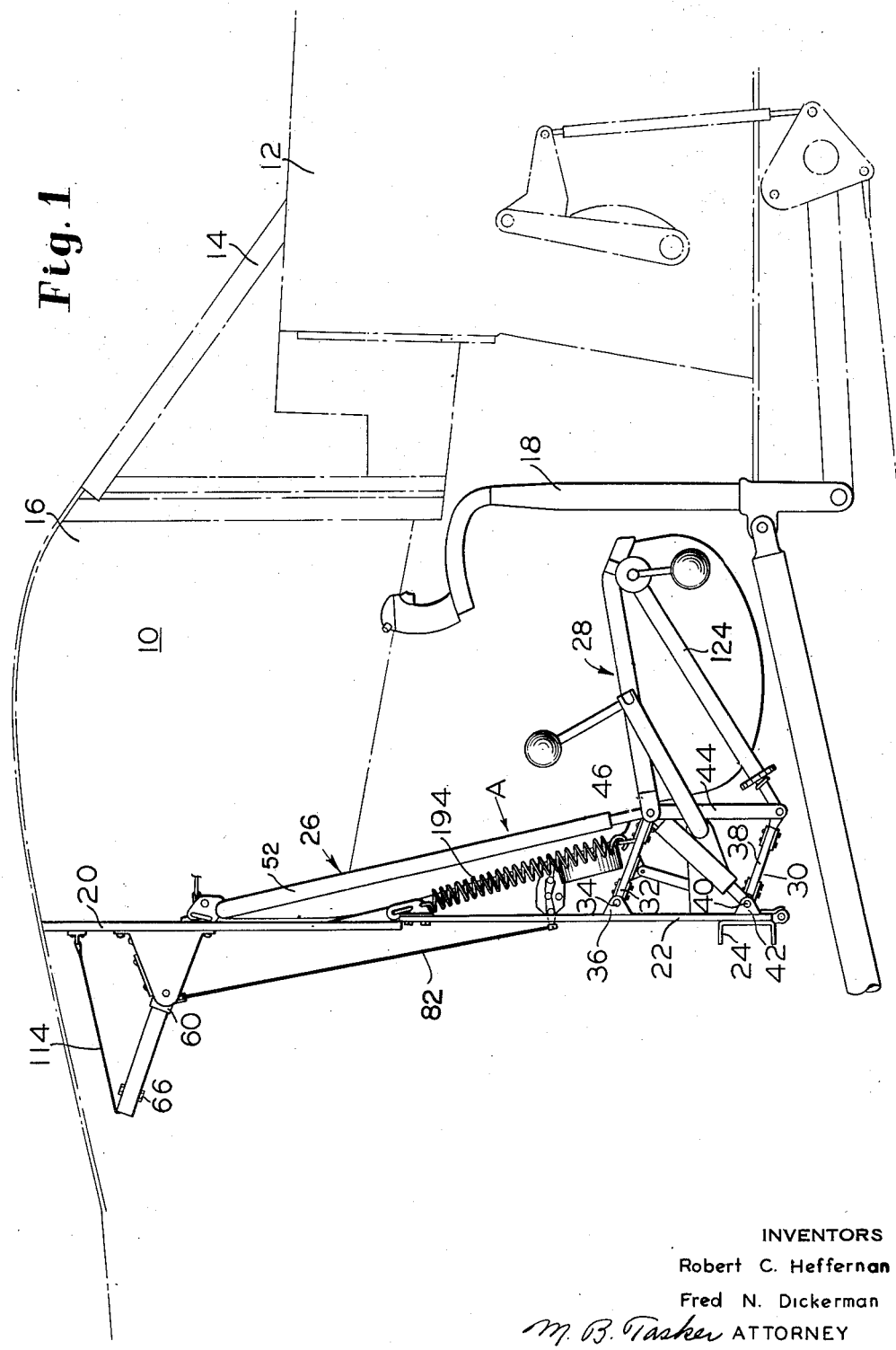
Fig. 1 is a side view of a seat embodying the invention installed in a fighter airplane.

Referring to Fig. 1, the seat embodying this invention, generally indicated by the letter A is installed in the cockpit 10 of a fighter airplane 12, having the usual windshield 14, transparent canopy 16 and pilot's control stick 18. The seat is carried by vertical fixed supports 20 and 22. These may comprise a part of the armour plate structure for the pilot's protection, and are carried by fixed frame members of the airplane, one of which is shown at 24.

Seat A comprises essentially a back portion 26, a bottom portion 28, a pivoted frame structure generally indicated at 30 for adjustably connecting the back and bottom seat portions to support 22 and suitable control mechanism operable by the pilot for adjusting the back and bottom portions either individually or as a unit. The bottom seat portion 28, which is of the bucket type, is adapted to house the parachute pack, jungle kit, and various other units (not shown) which the pilot carries with him when he is required to bail out of the airplane, these packs comprising in part the upholstery of the seat.

Figure 2:
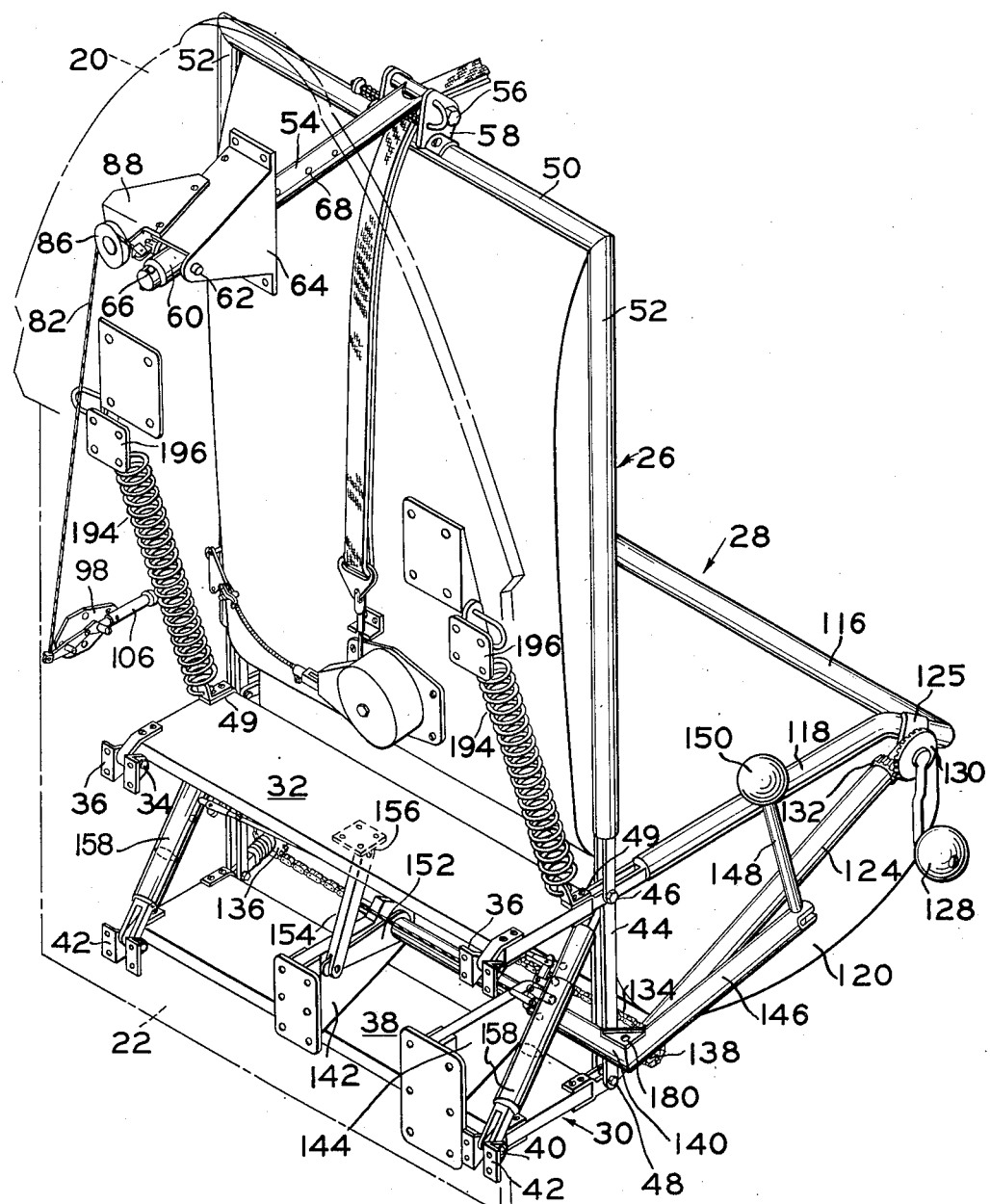
Fig. 2 is a perspective view of the seat of Fig. 1 looking forward from the right hand side.

The pivoted frame 30 includes an upper generally horizontal shelf-like member 32 (Fig. 2) pivoted at its rear edge on bolts 34 mounted in brackets 36 which are bolted to the face of support 22. A lower shelf-like member 38, which is parallel with member 32, is pivoted at its rear edge on bolts 40 mounted in brackets 42 similar to the brackets 36 and which are secured to support 22 at points spaced below the brackets 36. The forward edges of frame members 32 and 38 are pivotally connected at their lateral extremities by vertical links 44 the opposite ends of which are pivoted on pivot pins 46 and 48 mounted in suitable forwardly extending brackets 49 carried by members 32 and 38. It will be noted that the pivoted frame 30 in conjunction with the support 22 comprises a parallelogram of pivotally connected members of which the support 22 comprises a fixed member. Consequently movement of members 32 and 38 about their pivots 34 and 40 results in a generally vertical movement of the pivot pins 46 and 48.

The back portion 26 of the seat comprises a generally rectangular frame including the transverse upper frame member 50 (Fig. 2) and the parallel side frame members 52, the lower bifurcated ends of which are pivoted on the pivot pins 46 of the pivoted frame 30. The upper end of the back portion 26 is adjustably supported relative to fixed support 20 by a tubular rod 54 pivotally connected by bolt 56 at its forward end with a bracket 58 carried by the frame member 50 midway between the side members 52 and extended aft through an opening 53 in support 20. The aft portion of rod 54 is slidable through a tubular member 60 (Fig. 6) mounted on tubular trunnions 62 in a bracket 64 carried by the aft face of support 20, a stop pin 66 being provided in the extended end of rod 54 which engages the member 60 and determines the most forward position of the seat back. The rod 54 is provided with a plurality of horizontal holes 68 spaced along its length which are adapted to receive a locking pin 70 slidable in one of the tubular trunnions 62. Pin 70 is pivotally connected at 72 to operating link 74 pivoted at 76 on a laterally extended bracket 78 carried by bracket 64. The pin 70 is constantly biased for movement into any one of the holes 68 which may be in register with the pin by compression spring 80 which acts between the bracket 64 and the forward end of link 74. Pin 70 is adapted to be withdrawn from locking position by means of a cable 82 which is connected to link 74 at 84 and extends over a pulley 86 carried on extension 88 (Fig. 2) of bracket 64.

The withdrawal of pin 70 by the cable 82 is effected by pilot operated mechanism shown most clearly in Fig. 7. This mechanism includes a pair of toggle links 90 and 92 pivoted at 94 and 96 respectively on a supporting plate 98 which is extended fore and aft through a passage 99 in support 22 and is fixed to a wall of said passage. The toggle links are connected at their adjacent ends by a pivot pin 100 which moves in a slot 102 in the plate 98. The free end of link 90 is pivotally connected to cable 82 at 102 and the free end of link 92 is provided with a rod-like extension 104 on which a handle 106 is telescopically received, a spring (not shown) being provided in the handle for urging a pin 108 carried by the latter into terminal notches 110 in a slot 112 in which the pin 108 is received. It will be evident that the entry of pin 108 into notches 110 locks the handle 106 in either of its extreme positions while a slight pressure axially against the end of handle 106 will release the pin 108 permitting movement of the handle.

Figure 5:
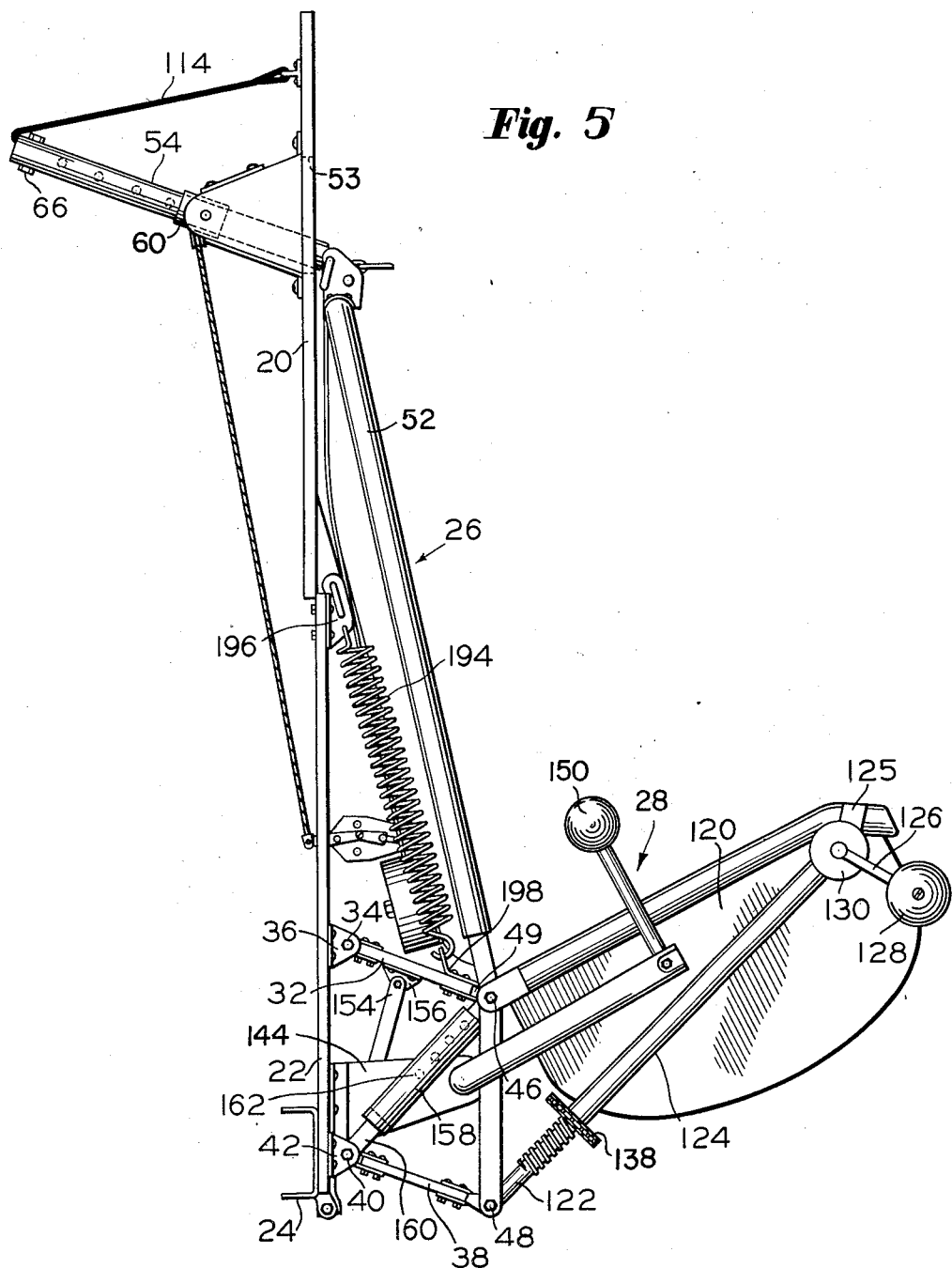
Fig. 5 is a view similar to Fig. 3 showing the seat in its lowermost position with the back and the bottom portions tilted.

A bungee spring 114 (Fig. 5) constantly biases the rod 54 in a direction to move the back portion of the seat forward against the back of the occupant whenever the pin 70 is withdrawn by movement of handle 106 from locking engagement with one of the holes 68. The seat portion 26 is moved against the bias of the spring when released by force exerted by the occupant of the seat against the back of the seat.

Figure 3:
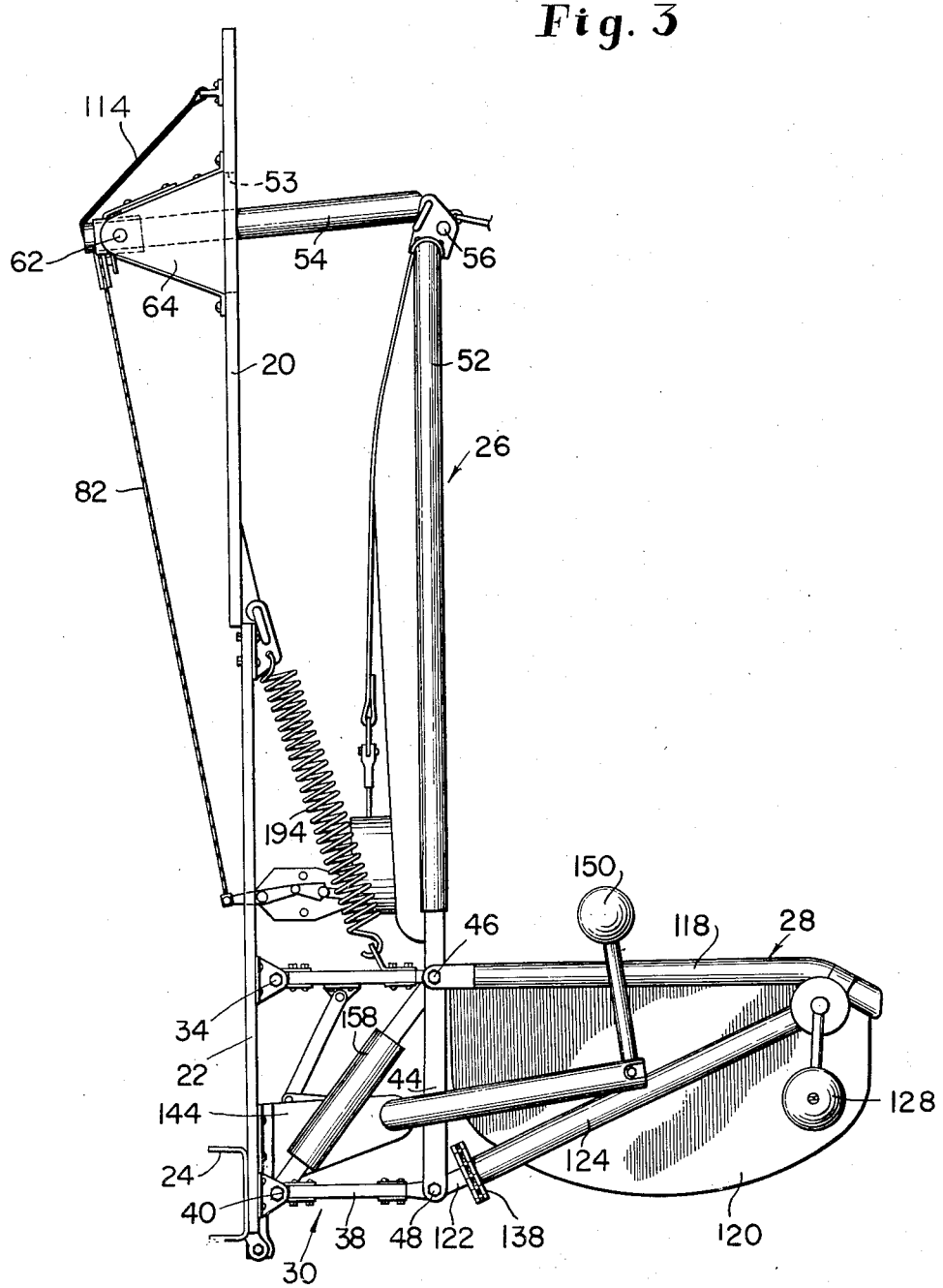
Fig. 3 is a side view of the seat adjusted to medium height with the back portion vertical and the bottom portion horizontal.
Figure 4:
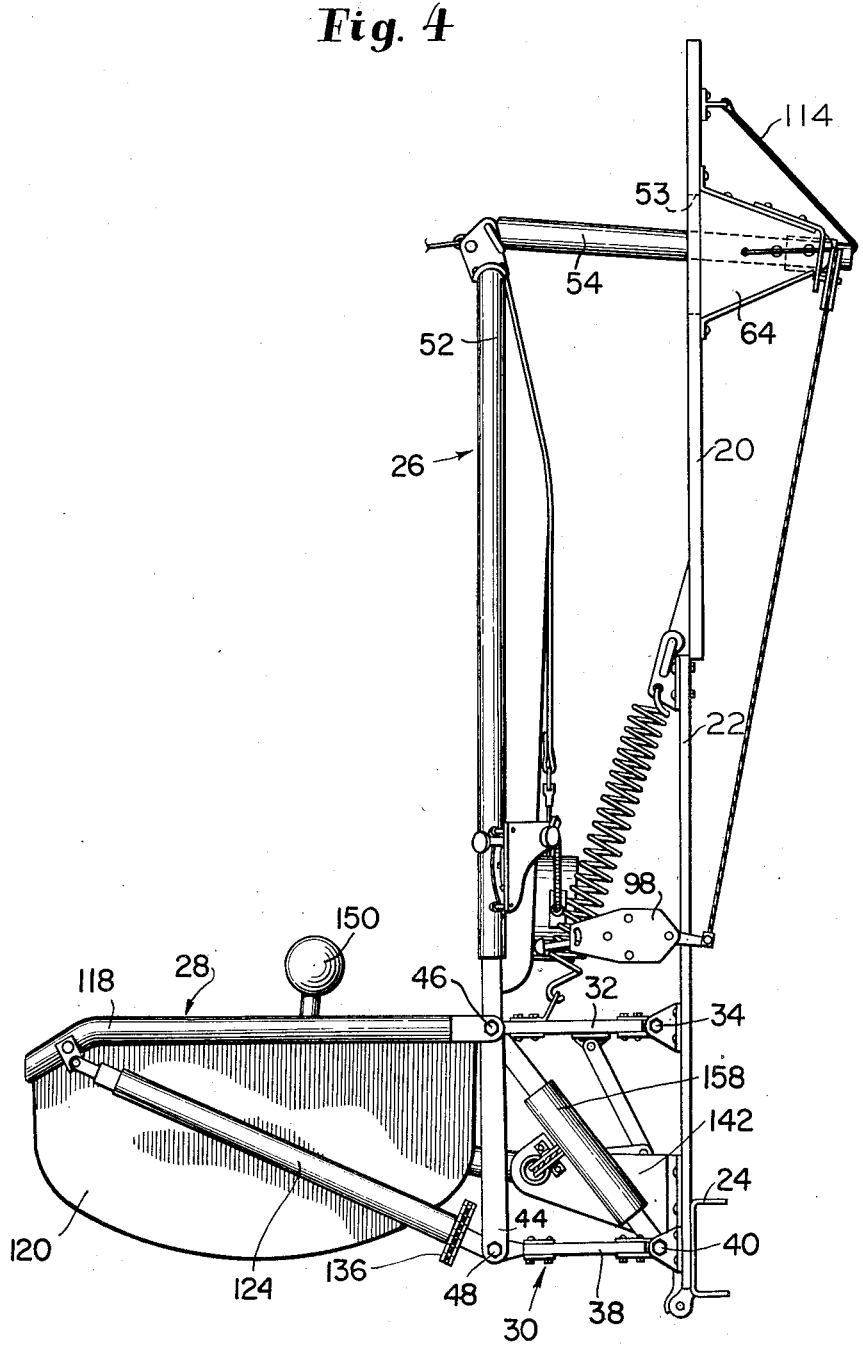
Fig. 4 is a view similar to Fig. 3 looking at the other side of the seat.

The seat bottom 28 comprises a frame including a front edge member 116 (Fig. 2) and side edge members 118, the rear ends of which are bifurcated and are pivotally mounted on the pivots 46 by which they are pivotally connected to the frame 30, this generally U-shaped frame constituting the support for the bucket 120 of the seat bottom. The bottom 28 is adapted to be adjusted about its pivots 46 into various angular positions by means of an extensible strut at each side of the seat including threaded rods 122 (Fig. 5) which are pivoted on pivot pins 48 of the frame at their aft ends and telescoping threaded sleeves 124 which are pivoted at their forward ends on brackets 125 clamped to the side edge members 118. Said sleeves 124 are rotatable by a crank 126 mounted in the bracket 125 at the right front corner of the seat bottom. The crank carries a handle 128 and a beveled gear 130 which meshes with a corresponding beveled gear 132 on the sleeve 124 of the right-hand strut. The strut at the opposite side of the seat is extended in unison with the strut at the right-hand side of the seat by means of a chain 134 (Fig. 2) running over a pair of equal diameter sprockets 136 and 138 carried by the sleeves 124. It will be evident that the vertical links 44 of the pivoted frame 30, the side member 118 of the seat bottom and the struts comprising members 122 and 124 comprise a triangular linkage of approximately right triangular form in the down position of the seat in which the strut is collapsed, and that extension of the strut will result in elevating the front edge 116 of the seat bottom from the position shown in Fig. 3 to the position shown in Fig. 5 or any intermediate position desired. It will be further evident that the seat bottom will remain fixed in any position of adjustment due to the non-reversible nature of the threaded connection between rods 122 and sleeves 124.

Means are also provided for raising and lowering the entire seat bodily and for holding it in a plurality of vertically adjusted positions. This means includes a horizontal shaft 140 (Fig. 2) mounted in brackets 142 and 144 carried by support 22 and extending from the right-hand side of the seat transversely to about the center of the seat. Shaft 140 carries a long right angular extension 146 which lies alongside the right-hand side of the seat and carries at its forward end an upstanding shaft 148 terminating in a handle 150. The shaft 140 and extension 146 are tubular and the shaft 148 is mounted for rotation about its longitudinal axis in the extension 146 for purposes hereinafter described.

The bracket 142 is disposed slightly beyond the mid-center position of the seat, and at the mid-center position an arm 152 fixed to shaft 140 is pivotally connected to the lower end of a link 154, the upper end of which is pivoted to a bracket 156 and mounted on the bottom of shelf 32 at the center of the seat. It will be evident that by the rotation of shaft 140 the pivoted frame 30 which comprises a parallelogram of links will be raised and lowered to raise and lower the pivot points 46 and 48 of the frame an equal distance, thus to raise and lower both the back portion and the bottom portion of the seat as a unit regardless of their individual positions of adjustment.

The means for holding the seat in its various positions of vertical adjustment comprises telescoping linkage disposed at each side of the seat and pivotally connected at its opposite ends to pivot points 40 and 46 of frame 30. Each of these linkages includes an outer tubular member 158 having a horizontal hole 159 therein (Fig. 8) and an inner rod member 160 having a plurality of horizontal pin receiving holes 162 along its length, each of which registers with hole 159 in member 158 in a different position of adjustment of frame 30. The tubular member 158 of the right-hand unit carries a bracket 164 on which is pivoted at 168 a link 166 parallel with said telescoping linkage. The link 166 carries a pin 170 which extends through the hole 159 in tubular member 158 and is adapted to enter into successive holes 162 in the various adjusted positions of the frame as the latter is moved from the full up position of the seat in Fig. 3 into the full down position shown in Fig. 5. The lower end of like 166 has a cable 172 pivotally connected to it at 174 and this cable extends over a pulley 176 (Fig. 8) mounted adjacent the open end of tubular shaft 140 and over a second pulley 178 which is mounted at the junction of tubular shaft 140 and tubular extension 146 on a pivot 180. The cable 172 extends over pulley 176, through shaft 140, over pulley 178, through tubular extension 146 and is secured by a fastening 182 to the lower end of shaft 148. It will be evident that rotation of the shaft 148 about its longitudinal axis by means of the ball-shaped handle 150 will cause the cable 172 to move the link 166 in a direction to withdraw the pin 170 in any of the positions of adjustment of the handle 150. Also the upper end of the link 166 is connected by a transverse rod 184 to the lower end of a link 186 pivoted at 188 on a bracket 189 carried by the tubular member 158 of the telescoping linkage at the opposite side of the seat. Link 186 carries a pin 190 similar to pin 170 which passes through hole 159 in tubular member 158 of the left-hand unit and enters into corresponding holes 162 in member 160. A spring 192 connected between the pivot point 188 and an intermediate point on rod 184 serves to bias both of the pins 190 and 170 into locking position.

A pair of tension springs 194 are provided for counterbalancing the weight of a pilot sitting in the seat so that the amount of force necessary for him to exert against the handle 150 to raise the seat or to lower the seat is only the difference between the pull of these springs and his weight. As shown most clearly in Fig. 5, the upper ends of the springs 194 are connected to brackets 196 carried by support 22, and the lower end of these springs are connected to lugs 198 secured to the top of shelf 32 just back of the forward edge thereof.

In using the seat the pilot adjusts the seat into the best position for visibility during take-off, which may vary somewhat with the stature of the particular pilot. After take-off he can lower the seat a little and adjust the bottom and back portions into a more comfortable position while he plots his course. Having finished this procedure he is able to tilt the back of his seat all the way aft, allowing it to carry the weight of his back pack. He can also tilt the bottom seat portion fully up and rest his feet on the top of his rudder pedals, thus enabling him to travel long distances without great fatigue. Upon nearing his mission the pilot can tilt his bottom seat portion fully down and his back seat portion fully forward and adjust the height of the seat to place him in the best position for using his gunsight. He can either lock the seat back in a given position by moving the handle 106 into the upper notch 110 (Fig. 7) or he can leave the seat back free if he wants it to move fore and aft under the action of spring 114 with no restriction by moving handle 106 from the position shown in Fig. 7 downwardly as indicated by the arrow.

It will be evident that by this invention a fully adjustable seat has been provided by which the occupant is enabled, not only to raise and lower the seat to suit his stature or as required for different conditions encountered during flight, but also one which enables the occupant to adjust both the back and the bottom portion of the seat in any position of vertical adjustment thereof all while occupying the seat and with a minimum of effort. It will further be evident that a seat has been provided in which following adjustment the various elements of the seat are held rigidly in adjusted position.

While only one embodiment of the invention has been shown in the drawings and described, it will be evident that various changes may be made in the construction and the arrangement of the parts without departing from the scope of the invention as defined by the claims.

What it is desired to secure by Letters Patent is:

1. In an adjustable seat, a support, fixed pivots carried by said support, a back portion including upper and lower movable pivots, link means operatively connecting said back portion to said fixed pivots, a bottom portion operatively connected to said back portion at said movable pivots including an extensible arm connected to one of said lower pivots, means operable by a seat occupant for extending said arm to fixedly adjust said bottom portion relative to said back portion whereby said bottom portion is pivoted about said movable pivots, rotatable control means adjacent said arm extending means and operatively connected to said link means for pivoting said movable pivots about said fixed pivots to vertically adjust the seat whereby said bottom portion maintains its relative position with said back portion, and lock means interconnecting one of said fixed pivots and one of said movable pivots for fixing the vertical adjustment of said seat including a lock member operatively connected to said control means and movable to a disengaged position in response to rotational movements of said control means.

2. A device according to claim 1 wherein said control means includes a rotatable horizontal shaft terminating in a forwardly disposed control arm, said arm having a rotatable handle thereon, a cable system carried in part by said shaft and arm and having operative connections to said handle for unlocking said lock member, and means for biasing said lock member to locked position.

3. In an adjustable seat, a support, fixed pivots carried by said support, a back portion including a first movable pivot carried thereby, link means connecting one of said fixed pivots to said first movable pivot, a bottom portion operatively connected to said first movable pivot and carrying a second movable pivot, said bottom portion including means for moving said bottom about said first movable pivot in adjusted relation with said back portion, means for adjustably moving said back portion about said first movable pivot, and control means operable by a seat occupant for moving said movable pivots each about one of said fixed pivots and in synchronous relation to vertically adjust said seat including operative connections between said movable pivots, whereby the adjusted positions of said back and bottom portions are maintained.

4. In an adjustable seat, a support, back and bottom portions mounted on said support for vertical adjustment as a unit including pairs of fixed and movable pivots, telescoping members interconnecting a pair of fixed and movable pivots, a horizontal shaft mounted on said support including a toggle link operatively connected to said back and bottom portions, means for rotating said shaft and a portion of said toggle link to extend said telescoping members and vertically adjust said seat, means for locking said seat in various positions of vertical adjustment, a forward extension on said shaft terminating in a rotatable handle, means for operatively connecting said handle with said seat locking means whereby rotation of said handle controls the unlocking of said seat, and biasing means for controlling the locking of said seat.

ROBERT C. HEFFERNAN.
FRED N. DICKERMAN.

REFERENCES CITED

The following references are of record in the file of this patent:

UNITED STATES PATENTS

| Number | Name | Date |
|---|---|---|
| 267,748 | Hartley | Nov. 21, 1882 |
| 363,751 | Longfellow | May 24, 1887 |
| 514,830 | Kern | Feb. 13, 1894 |
| 519,883 | Browne | May 15, 1894 |
| 1,713,034 | Denson et al. | May 14, 1929 |
| 2,118,689 | LeGrand | May 24, 1938 |
| 2,133,471 | Opperman | Oct. 18, 1938 |
| 2,345,182 | Corber | Mar. 28, 1944 |
| 2,459,843 | Scholander | Jan. 25, 1949 |
| 2,485,111 | Robins | Oct. 18, 1949 |

FOREIGN PATENTS

| Number | Country | Date |
|---|---|---|
| 853,982 | France | Dec. 23, 1939 |